United States Patent
Gao et al.

(10) Patent No.: US 9,143,370 B2
(45) Date of Patent: Sep. 22, 2015

(54) DC CORRECTION FOR ACCURATE DETECTION OF PULSES

(71) Applicant: Cisco Technology, Inc., San Jose, CA (US)

(72) Inventors: Zhigang Gao, Richfield, OH (US); Raghuram Rangarajan, Santa Clara, CA (US); David Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 14/037,807

(22) Filed: Sep. 26, 2013

(65) Prior Publication Data

US 2015/0085958 A1    Mar. 26, 2015

(51) Int. Cl.
*H04B 15/00*    (2006.01)
*H04L 25/06*    (2006.01)

(52) U.S. Cl.
CPC .................................... *H04L 25/063* (2013.01)

(58) Field of Classification Search
USPC .......................................... 375/316, 346–347
See application file for complete search history.

(56) References Cited

U.S. PATENT DOCUMENTS

| | | | |
|---|---|---|---|
| 5,621,765 A * | 4/1997 | Glass | 375/317 |
| 6,714,605 B2 | 3/2004 | Sugar et al. | |
| 6,850,735 B2 | 2/2005 | Sugar et al. | |
| 7,190,733 B2 | 3/2007 | Sugar | |
| 7,224,752 B2 | 5/2007 | Sugar et al. | |
| 7,254,191 B2 | 8/2007 | Sugar et al. | |
| 7,292,656 B2 | 11/2007 | Kloper et al. | |
| 7,362,814 B2 | 4/2008 | Sugar | |
| 7,606,335 B2 | 10/2009 | Kloper et al. | |
| 8,730,609 B1 * | 5/2014 | Tang et al. | 360/65 |

OTHER PUBLICATIONS

Yates et al., "DC Blocker Algorithms," IEEE Signal Processing Magazine, Mar. 2008, pp. 132-134.

* cited by examiner

*Primary Examiner* — Dac Ha
*Assistant Examiner* — Janice Tieu
(74) *Attorney, Agent, or Firm* — Edell, Shapiro & Finnan, LLC

(57) ABSTRACT

Techniques are presented herein for distinguishing between the DC component of a real signal and DC energy of a received signal due to the radio receiver circuitry. Samples are obtained of a received signal derived from output of a receiver of a communication device. A mean of the samples is computed over a sample window comprising a predetermined number of samples. First and second thresholds are provided, the first threshold being greater than the second threshold. An absolute value of the mean is compared with respect to the first threshold and the second threshold as samples are obtained in the sample window. A selection is made between the first threshold and the second threshold for purposes of comparison with the absolute value of the mean to determine whether energy at DC is a true/real DC component of the received signal or is due to circuitry of the receiver.

20 Claims, 9 Drawing Sheets

DC CORRECTION FOR ACCURATE DETECTION OF PULSES

TECHNICAL FIELD

The present disclosure relates to wireless communication devices systems.

BACKGROUND

In wireless networks, such as IEEE 802.11 (Wi-Fi™) wireless networks, more sophisticated access points can detect the presence of other transmitters/emitters that are the primary users in a frequency band, and switch to a different radio frequency (RF) channel, if necessary. This capability is known as Dynamic Frequency Selection (DFS).

An access point needs to precisely determine the types of signals occurring in the frequency band in order to invoke DFS. Switching to another channel when it is unnecessary can be disruptive to the traffic handling responsibilities of an access point. Conversely, not switching to another channel when the access point should be switched can be detrimental to the operation of the primary users in the shared frequency band in which Wi-Fi networks operate, and in violation of regulatory requirements.

DESCRIPTION OF EXAMPLE EMBODIMENTS

Overview

Figure 1:
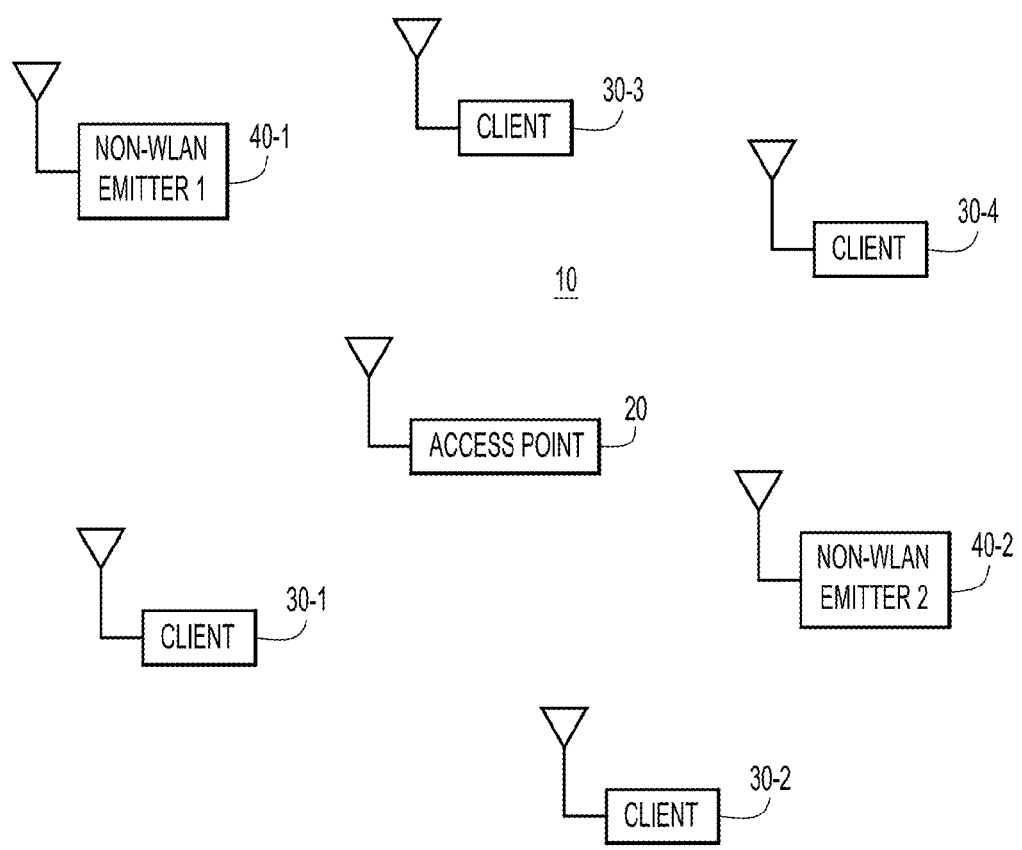
FIG. 1 is a diagram illustrating an example of a wireless network in which a wireless access point device may be configured to use the DC correction techniques presented herein.

Techniques are presented herein to distinguish between the true DC component of a signal and DC resulting from the radio receiver circuitry (the latter for which DC correction should be applied). Samples are obtained of a received signal derived from output of a receiver of a communication device. A mean of the samples is computed over a sample window comprising a predetermined number of samples. First and second thresholds are provided, the first threshold being greater than the second threshold. An absolute value of the mean is compared with respect to the first threshold and the second threshold as samples are obtained in the sample window. A selection is made between the first threshold and the second threshold for purposes of comparison with the absolute value of the mean to determine whether energy at DC is the result of a real/true DC component of the received signal or is due to DC of the receiver circuitry.

EXAMPLE EMBODIMENTS

There are certain emitters that may occur in the unlicensed frequency bands in which Wi-Fi networks operate that, due to regulatory requirements, have a higher priority than Wi-Fi networks. Radar systems are one example of such higher priority users. With the advent of short pulse width radar (e.g., 0.4μ-0.5 μs pulse width for maritime radar) and more spectrum being opened in the 5 GHz band for 80/160 MHz channels, accurate detection of pulse widths has become challenging. These radar pulses are so short in duration that most hardware pulse detection circuitry leaves a lot of direct current (DC) energy at the end of the pulse during receiver processing (downconverting to baseband, filtering, etc.), so that it can be misconstrued as a relatively long duration pulse, and thus resulting in inaccurate pulse width estimation. Sometimes long chirp pulses at high energy also causes pulse detection circuitry to output residual DC energy that gives an inaccurate pulse width estimate. It is to be understood that "energy at DC" or "DC energy" is meant to refer to energy at or substantially close to zero frequency.

Pulse width estimations are provided as input to a spectrum intelligence detection algorithm that is used to make a detection of the non-Wi-Fi signals occurring in the unlicensed frequency band. Inaccurate pulse width estimates can negatively affect the output/decisions of the spectrum intelligence detection algorithm.

Many real world radio receivers have some amount of DC impairing the design, and so require one or more forms of DC correction. When detecting radar pulses that can be quite short (less than 1 μs), DC correction might interfere with the detection of signals that are close to DC by a) inadvertently removing a radar signal; b) injecting the negative of the DC component of a non-radar pulse after the pulse ends to create a short false transient; and c) going on and off, such that a longer signal is broken into smaller pulses that could be confused with radar.

As explained above, due to high levels at DC caused by circuitry (e.g., mixers, amplifiers, etc.) in the receiver, short pulses can be interpreted, by hardware or software, as being longer in duration than the actual duration of the pulses. In order to overcome such issues and enable higher accuracy pulse width estimation and Receive Signal Strength Information (RSSI) estimation, the DC correction process presented herein filters DC only for the purposes of estimating the width of the pulse for purposes of time domain pulse detection schemes, but without affecting any post processing, such as in-phase (I) and quadrature (Q) post processing.

Moreover, since a real radar signal could be a tone (energy) at or very close to DC, a more complicated/intelligent filtering scheme is provided to not falsely estimate the width of a pulse in the presence of receiver circuit energy at DC, while still being able to detect true signal energy at or near DC.

Referring first to FIG. 1, a diagram is shown of a wireless local area network (WLAN) 10 in which a wireless access point (AP) 20 is serving a plurality of wireless clients 30-1, 30-2, 30-3 and 30-4. It should be understood that FIG. 1 is a simplified example, and that a real wireless network deployment would have numerous APs and clients. The AP 20 may be communicating with clients 30-1 through 30-4 on a particular radio frequency (RF) channel.

FIG. 1 also shows presence of non-WLAN emitters 40-1 and 40-2. Each of these devices may emit or transmit in the unlicensed frequency band in which the AP 20 is capable of operating, and in particular, within the RF channel in which the AP is serving clients 30-1, 30-2, 30-3 and 30-4. The AP 20 may be configured with spectrum intelligence processing capability so that it can detect and classify non-WLAN emitters 40-1 and 40-2, in order to determine whether and how to change the way it wirelessly communicates with clients 30-1, 30-2, 30-3 and 30-4. To perform the spectrum intelligence processing, the AP 20 detects individual pulses of energy, and based on a priori knowledge about the types of devices that may operate in the frequency band in which the AP 20 operates, the AP 20 can analyze pulses (in terms of pulse width, center frequency, repetition rate/periodicity, etc.) to classify the non-WLAN emitters. For example, if the AP detects non-WLAN emitter 40-1 and determines that it is a radar emitter, then the AP 20 needs to immediately change to a different RF channel (that is, invoke a Dynamic Frequency Selection) in order to serve clients 30-1, 30-2, 30-3 and 30-4, in compliance with regulations in the United States concerning radar emitters in the unlicensed frequency band. On the other hand, the AP 20 may detect and classify non-WLAN emitter 40-2 as a different type of device/emitter, and may be configured to change one or more of its power level, data rate, etc., without changing to a different RF channel, in order account for the presence of the non-WLAN emitter 40-2. Changing channels can be disruptive to ongoing communication sessions maintained by the AP 20 (e.g., for video or audio), so falsely detecting non-radar signals as radar should be avoided. The DC correction techniques presented herein use a non-linear analysis technology to avoid false radar detection.

Figure 2:
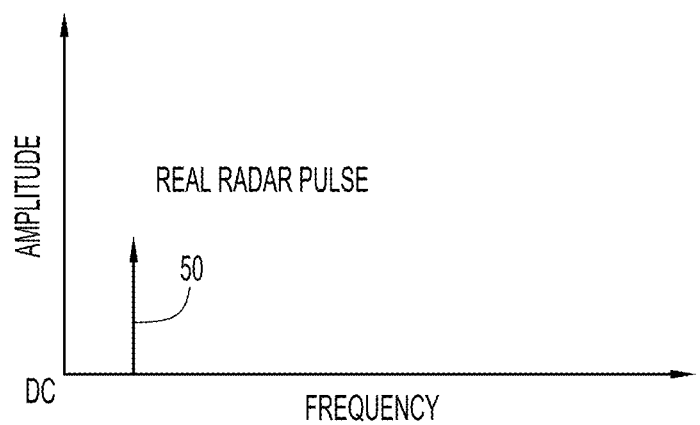
FIG. 2 illustrates a frequency domain plot of a radar pulse that may be more accurately detected using the DC correction techniques presented herein.

As explained, the ability to determine whether or not to invoke a DFS, or take some other action, based on a detected non-WLAN emitter, is related to the ability of the AP to accurately perform pulse detection of non-WLAN emitters. FIG. 2 illustrates a frequency domain plot in which a real radar pulse 50 is shown at a frequency close to DC (close to zero frequency). It is important that the AP 20 be able to detect the pulse 50 as being a real radar pulse, rather than irrelevant DC energy.

Figure 3:
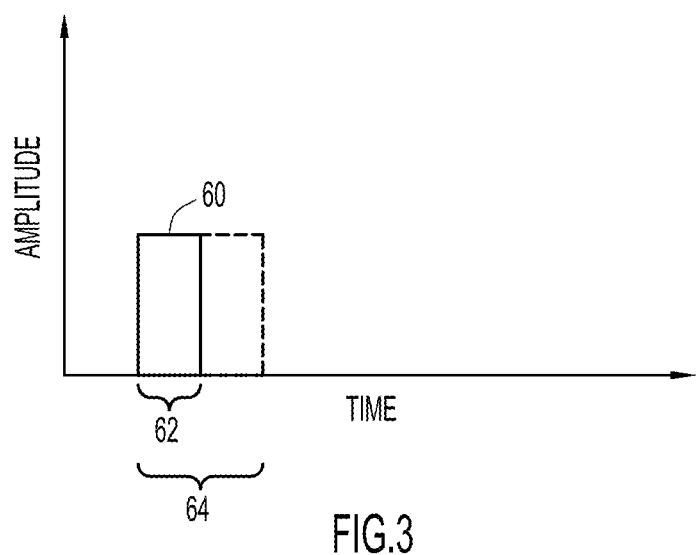
FIG. 3 illustrates a time domain plot of a pulse, and in particular showing the challenge in accurately detecting a pulse width in the presence of DC.

FIG. 3 shows a time domain plot of an example pulse 60. The pulse 60 has a width or duration 62, but due to the presence of DC, the pulse 60 may be miss-interpreted as being longer in duration than it really is, as shown at reference numeral 64. The DC correction process described hereinafter reduces the likelihood of inaccurately determining the width of a pulse, caused by high level of receiver circuit energy at DC.

Figure 4:
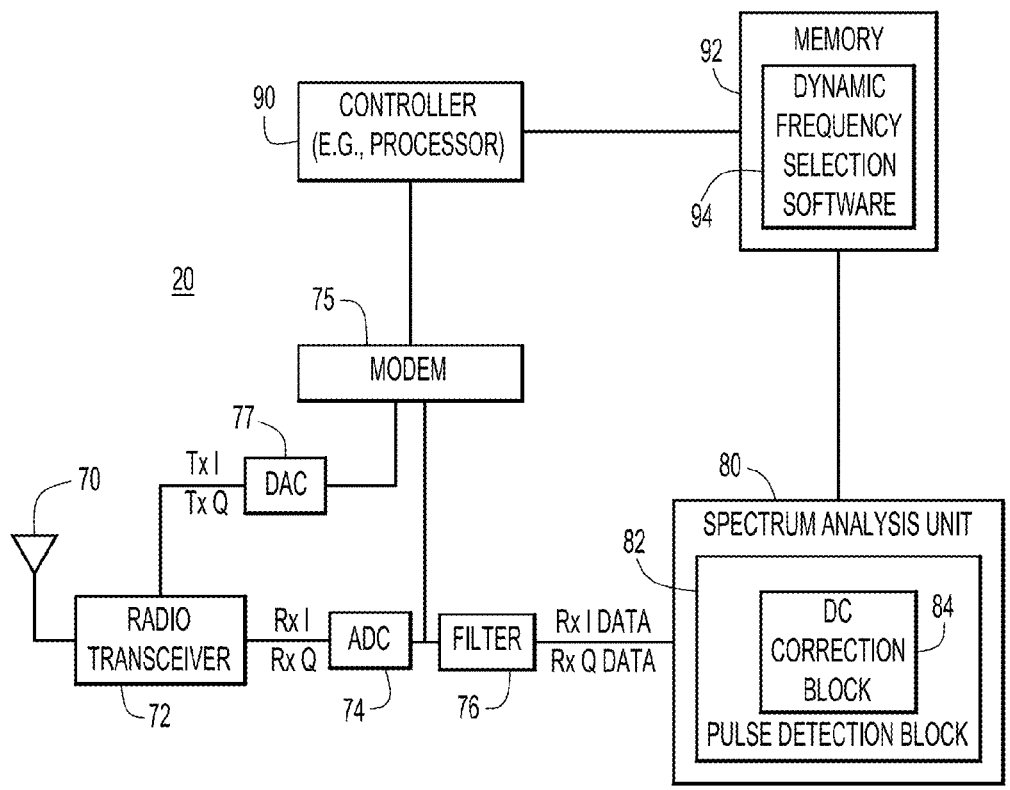
FIG. 4 is an example block diagram of a communication device, e.g., an access point, configured to perform the DC correction techniques presented herein.

FIG. 4 illustrates an example block diagram of a communication device, e.g., an AP 10, configured to perform the DC correction process presented herein. The AP 20 includes at least one antenna 70, a radio transceiver 72, an analog-to-digital converter (ADC) 74 coupled to the receive outputs of the radio transceiver 72, a filter 76, and a spectrum analysis unit 80. The spectrum analysis unit 80 may be hardware (e.g., digital logic gates) configured to perform real-time analysis of the raw I and Q outputs of the ADC 74. To this end, the spectrum analysis unit 80 includes a time domain pulse detection block 82, and the pulse detection block 82 includes a DC correction block 84. The DC correction block 84 comprises digital logic gates configured to perform the DC correction process presented herein.

To perform baseband signal processing (for modulation and demodulation), a modem 75 is provided that is connected to the output of the ADC 74 as well as to a digital-to-analog converter (DAC) 77, which in turn is connected to the radio transceiver 72. As an alternative, a separate dedicated radio transceiver connected to the modem 75 may be provided for handling traffic. In either case, the modem 75 handles baseband transmit processing, and supplies baseband transmit signals to the DAC 77, which converts them to analog signals for transmission by the transmitter contained within the radio transceiver 72. The modem 75 also handles baseband receive processing of receive signals derived from the output of the ADC 74.

As shown in FIG. 4, the Rx I and Rx Q receive outputs of the radio transceiver 72 are supplied to the ADC 74, which converts them to digital sample values. The filter 76 filters these values, and supplies filtered Rx I data and Rx Q data to the spectrum analysis unit 80.

The AP 20 also includes a controller 90 and a memory 92. The controller 90 is a processor, such as a microprocessor or microcontroller, which executes software instructions stored in memory 92. In particular, instructions for dynamic frequency selection (DFS) software 94 are stored in memory 92, which, when executed by the controller 90, enable the controller to perform DFS operations based on input provided by the spectrum analysis unit 80.

While FIG. 4 shows that the DC correction process is performed by hardware in the spectrum analysis unit 80, it is to be understood that the DC correction process may be performed partially or entirely by software stored in memory 92 and executed by controller 90 or by another microprocessor or microcontroller.

The memory 92 may comprise read only memory (ROM), random access memory (RAM), magnetic disk storage media devices, optical storage media devices, flash memory devices, electrical, optical, or other physical/tangible memory storage devices. In general, the memory 92 may comprise one or more tangible (non-transitory) computer readable storage media (e.g., a memory device) encoded with software comprising computer executable instructions and when the software is executed (by the controller 90) it is operable to perform various operations, including some or all of the DC correction operations described herein.

Generally, the spectrum analysis unit 80 generates data used by the controller 90 to perform spectrum intelligence operations in the AP 20. For example, the spectrum analysis unit 80 generates data describing center frequency, duration (pulse width), periodicity, bandwidth, etc., of pulses of energy detected by the radio transceiver 72 in one or more radio frequency channels of interest. More specifically, the pulse detection block 82 includes logic to perform time domain analysis of the filtered Rx I and Rx Q data according to the duration or width, and energy of pulses. Other functions of the pulse detection block 82 (or other blocks, not shown, of the spectrum analysis unit 80) include determining receive signal strength information (RSSI) of pulses of energy. The DC correction techniques presented herein improve the performance of the pulse width estimation and RSSI computation functions of the spectrum analysis unit 80.

Figure 5:
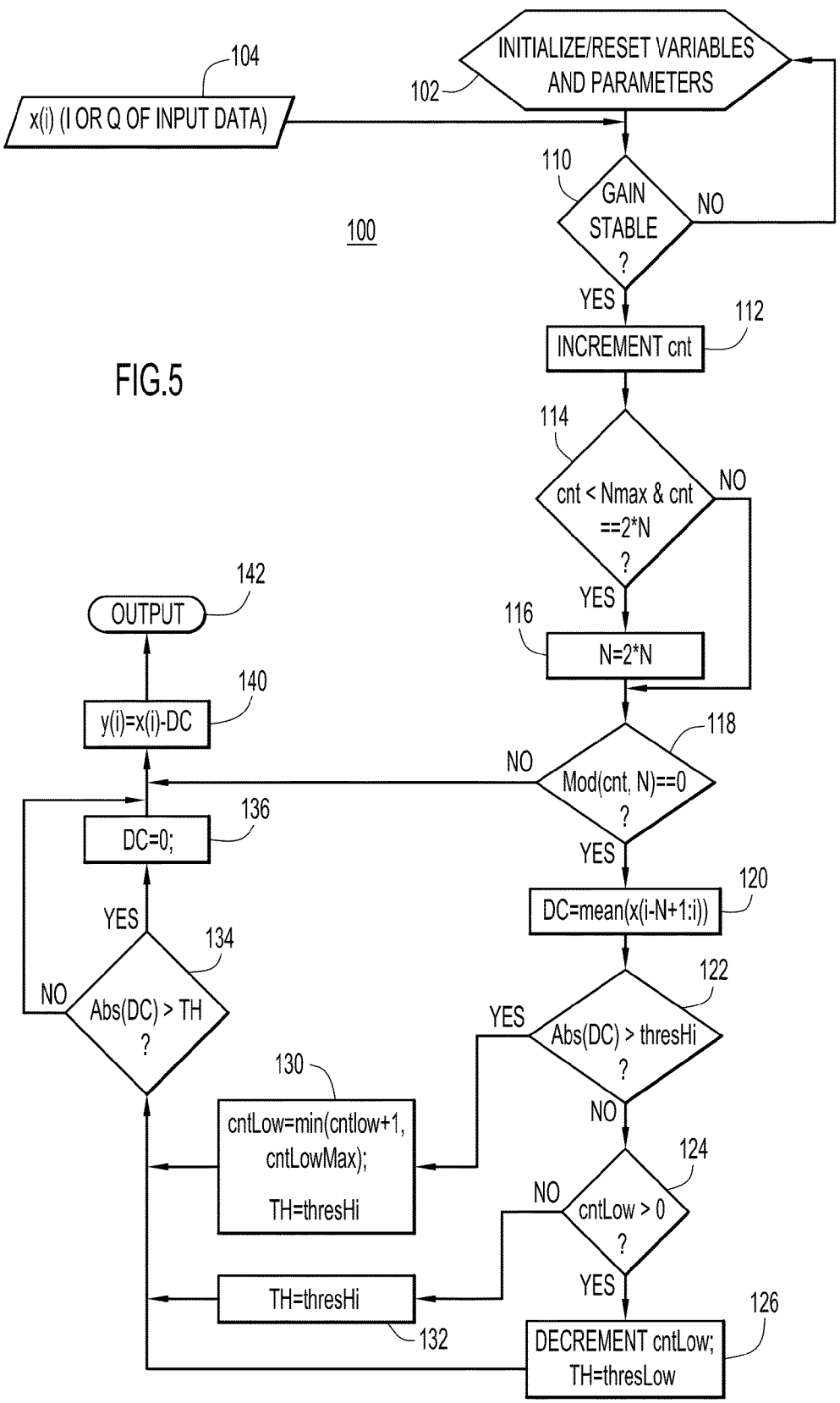
FIG. 5 is a flow chart depicting the operations of the DC correction process presented herein.
Figure 6:
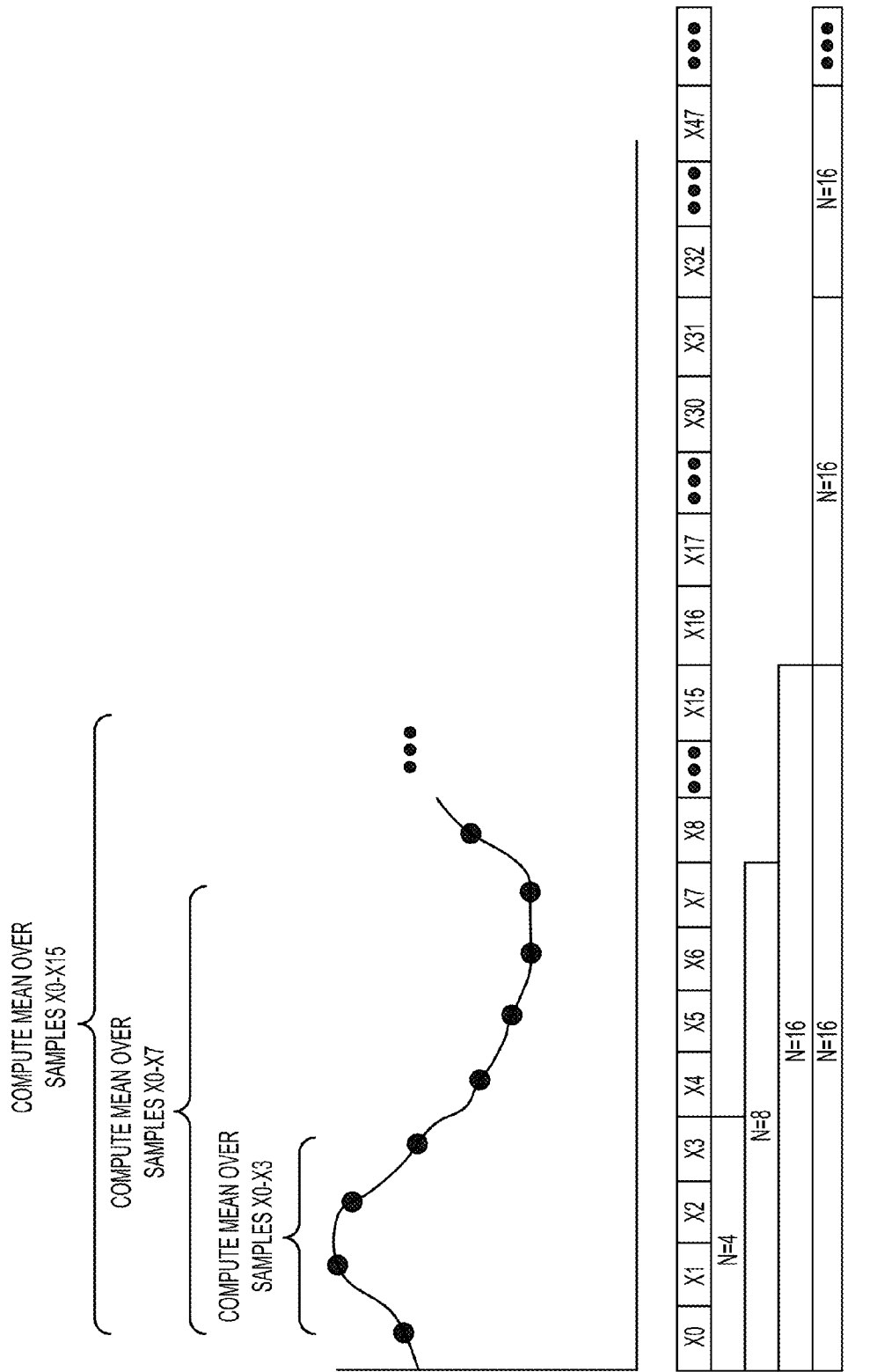
FIG. 6 is a diagram illustrating the dynamically expanding window used in the DC correction process.

Reference is now made to FIG. 5 together with FIG. 6, for a description of a flow chart that depicts the operations for the DC correction process 100 presented herein. The process 100 uses block-based averaging with adaptive (expanding) window sizes N of samples X0, X1, and so on. The maximum window size is 16 samples for a 20 MHz channel, in one example. The operations depicted in the flow chart of FIG. 5 are called for each input I and Q sample of a received signal, and are repeated/performed for both I and Q signal paths. At 102, various variables and parameters used in the process 100 are initialized (or reset to their initial values if it is determined that the gain is unstable at 110 as described below).

Variable and Parameter Initializations cnt is a counter that is used to count the number of input samples that have been processed. It is initially set to zero.

cntLow is a counter used to serve as a delay or tolerance for the number of pulses above a DC threshold. It is initially set to zero for a maximum value cntLowMax.

DC is the DC correction value and it is initially set to zero.

N is a sample window size, and it is initially set to 4.

Nmax is the maximum window size, which is set to be a percentage of the bandwidth of the channel of interest, e.g., 0.8×bandwidth.

thresLow and thresHi are first and second threshold values, respectively, with respect to which DC correction may or may not be needed if a sufficient number of samples below or above these thresholds, respectively, occur.

cntLowMax is a value set in order to achieve hysteresis. If the signal level is above the high threshold (thresHi) for some period of time (and so DC correction is not applied), it would need to fall below the lower threshold (thresLow) for some time before DC correction can be applied. Otherwise, a borderline value would bounce between corrected and uncorrected, and appear like new pulses.

TH is a threshold value that is initially set to thresHi, but can be set to thresLow during the process, as explained below.

The input is x(i) and is shown at 104 in FIG. 5. As explained above, the input x(i) is either an I sample or a Q sample and it is a numerical value. This process is called each time an I sample or a Q sample is made available.

At 110, it is determined whether the amplifier gain (of the amplifiers in the radio transceiver) is stable. If the gain is determined to be stable, then the process can proceed; otherwise, further processing is held until the gain is stable and a return is made to operation 102 where the parameters and variables described above are reset to their initial values. Assuming gain is stable, processing continues to 112, where the counter cnt is incremented. Next, at 114, a determination is made as to whether the value of the counter cnt is less than the maximum window size, Nmax, and whether the value of the counter cnt is equal to twice the current window size (2*N). If the determination at 114 is affirmative (yes), then the window size is doubled at 116. Thus, operation 116 involves the adaptive expanding of the window size. Otherwise, processing continues to 118. In other words, at 114, as long as the counter cnt is less than Nmax and cnt is not twice the window size N, then the window size is not doubled, and otherwise the window size N is doubled at 116.

At 118, it is determined whether modulo (Mod) of the counter value cnt and N is equal to zero. That is, at 118, it is determined whether the number of samples processed has reached the multiple of window size N. If so, then at 120, mean(x(i−N+1:i) is computed. In other words, a mean of the samples for a block of samples of the current window N is computed, and this value is saved into the variable DC as the current DC level and is used until the next window size is reached, when the mean is computed again for the next window size. The operation 118 ensures that the number of samples taken in so far has reached the total number of samples for the current window or block size, before the mean computation is made at operation 120. As shown in FIG. 6, the mean computation will be performed after 4 samples, then again after 8 samples, and finally again after a total of 16 samples, in the example where N=4 and Nmax=16.

At 122, the absolute value of the current DC level is compared to thresHi. If Abs(DC) is greater than thresHi, processing continues at 130. If Abs(DC) is not greater than thresHi, then at 124, the variable cntLow is compared to zero. If cntLow is greater than zero, then at 126, cntLow is decremented and the variable TH is set to thresLow. If it is determined at 124 that cntLow is not greater than zero, then processing goes to 132. At 132, the variable TH is set to thresHi.

If at 122, it is determined that Abs(DC) is greater than thresHi, then at 130, the variable TH is set to thresHi, and cntLow is set to min(cntLow+1, cntLowMax), i.e., the minimum of cntLow+1 and cntLowMax.

After operation 130 and operation 132, operation 134 is performed. At operation 134, Abs(DC) is compared to TH, where TH was either set to thresHi in operations 130 or 132, or to thresLow in operation 126. If Abs(DC) is greater than TH, then at 136, the DC level is set to zero. On the other hand, if Abs(DC) is not greater than TH, then operation 136 is skipped and any DC level computed at operation 120 previously is maintained. At 140, the DC corrected output y(i) is computed by subtracting the value of DC from the input sample value x(i). Again, if DC was set to zero in 136, then no DC correction is made to input sample value x(i). As explained above, the process 100 is called each time an I or Q sample is output (x(i)). The process involving operations 112 through 140 repeats for I samples and Q samples over the sample windows (e.g., 4, 8, 16) as described above as future samples are available until cnt reaches 16, and then repeated for new samples over time for a fixed window size of 16. In other words, the window size is initially set to 4, then doubled to 8, then doubled to 16 when more samples come in. After that, the window size will be fixed at 16 until the gain state changes and then all parameters are reset to their initial values as described above, and the process is repeated with the initial values.

To summarize, the process 100 involves obtaining samples of a received signal derived from output of a receiver of a communication device, and computing a mean of the samples over a sample window comprising a predetermined number of samples. First and second thresholds are provided (thresHigh and threshLow), the first threshold (thresHigh) being greater than the second threshold (thresLow). An absolute value of the mean is compared with respect to the first threshold and the second threshold as samples are obtained in the sample window. A selection is made between the first threshold and the second threshold for purposes of determining whether energy at DC of the received signal is a real/true DC component of the received signal or is due to circuitry of the receiver. This selection is achieved by way of the operations 122, 124, 126, 130 and 132 in FIG. 5. The counter cntLow is used to determine the threshold selection. For a given sample, the counter cntLow (initialized at zero) is incremented when the absolute value of the mean is greater than the first threshold. When the counter cntLow is greater than zero, the counter is decremented when the absolute value of the mean is not greater than the first threshold. The threshold selection involves selecting the first threshold when the absolute value of the mean is greater than the first threshold (e.g., operation 130) and selecting the second threshold when it is determined that the absolute value of the mean is not greater than the first threshold and the counter is greater than zero (e.g., operation 126). Moreover, when the absolute value of the mean is not greater than the first threshold, and the counter is not greater than zero (e.g., operation 124), the first threshold is selected.

As depicted by operations 130 or 132, and operations 134 and 136, by virtue of the threshold selection, a DC correction value is set equal to zero when the absolute value of the mean is greater than the selected one of the first threshold or second threshold ("yes" branch of operation 134). On the other hand, when the absolute value of the mean is less than the selected one of the first threshold or the second threshold, the DC correction value is set to the mean (e.g., "no" branch of operation 134). The DC correction value is subtracted from future samples outside of the sample window to generate output samples (e.g., operation 140).

Moreover, these techniques use a dynamically expanding window over which a mean of I samples and a mean of Q samples are computed as the current DC level. The mean is subtracted from future input I and Q samples, respectively, before calculating RSSI and performing time domain pulse detection. The first window size is 4 samples (N=4). The mean is taken over first 4 samples, and at the end of the first window size, the window size is doubled (at operation 116) to N=8 (counting from the gain stable true determination in operation 110). The mean is computed again over N=8 samples and subtracted from future samples, then again over 16 samples, where Nmax=16, in one example. The window size is then fixed at 16 and the mean will be taken for every future 16 I and Q samples.

At the end of each window (4 samples, 8 samples and 16 samples), the mean of the I and Q samples is compared to a threshold (i.e., threshold TH, which can be set equal to thresLow at 126 or to thresHi at 130 or 132) at operation 134. If either the mean of the I samples or the mean of the Q samples is above the threshold TH, the new correction will be 0, as the samples are likely associated with a real/true energy at DC of the received signal. A value of DC=0 essentially disables DC correction. Otherwise, if the mean of the I samples or mean of the Q samples is not greater than the threshold TH, there is DC (caused the circuitry in the receiver) that should be corrected for, and consequently, the mean is subtracted from the samples over the next Window period as explained above in connection with operations 134 and 140.

Sometimes DC is corrected in the middle of an actual pulse. In order to avoid false (unnecessary) DC corrections on small dips of signal variance of a pulse, cntLow and two thresholds thresLow and thresHi are used. The counter cntLow is increased by one for each sample above thresHi until it reaches the value set for cntLowMax (in operation 130), and is decreased by one for each sample below thresLow until it is zero (in operation 126). DC correction is only applied when the counter cntLow is equal to zero.

Again, the DC correction process described above employs a moving window whose size is dynamically changed over time. The moving window is used to compute a mean of the magnitude of samples in order to determine how, if at all, to make a DC adjustment/correction for future samples. The use of a dynamic window size improves the response time of DC correction, and achieves a more accurate pulse width estimation. Accurate pulse width estimation even on short pulses allows for more robust radar detection. False radar pulse detection can be dramatically improved, and the more precise pulse width estimation can be useful in determining the specific type of radar pulse pattern to be detected as a true/real radar signal.

Reference is now made to FIGS. 7A-7D and FIGS. 8A-8D. In both sets of figures, there are four subplots. The x-axis in all plots is frequency offset in MHz, center frequency of pulses to center frequency of channel, and the y-axis is pulse width, except for the subplots of FIGS. 7A and 8A, in which the y-axis is the number of pulses detected. FIGS. 7A-7D are subplots when the DC correction techniques presented herein are not used, and FIGS. 8A-8D are subplots when the DC correction techniques presented herein are used.

Figure 7A:
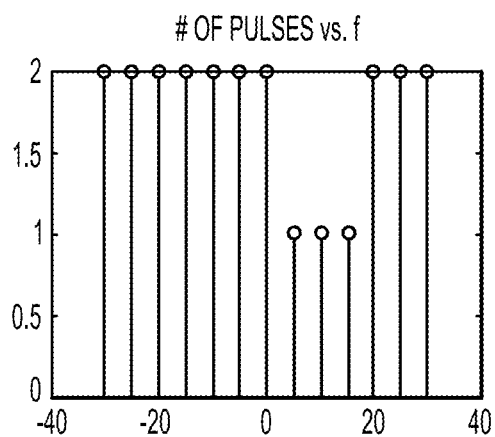
FIGS. 7A-7D illustrate example sample plots for pulse width estimations when the DC correction techniques presented herein are not used.
Figure 8A:
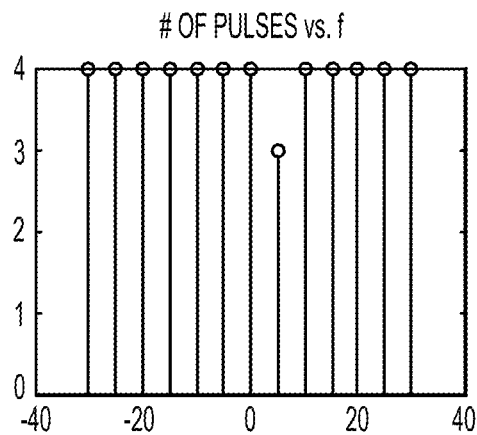
FIGS. 8A-8D illustrate example sample plots for pulse width estimations when the DC correction techniques presented herein are used.

Subplots in FIGS. 7A and 8A show that the number of pulses detected at different frequency offsets should be 4. Without DC reduction using the techniques presented herein, a maximum of two pulses were detected, and with DC reduction using the techniques presented herein, only one pulse at a frequency offset of 5 MHz is missed.

Figure 7B:
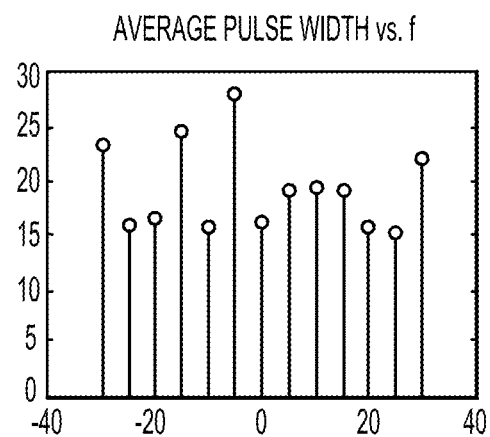
Figure 8B:
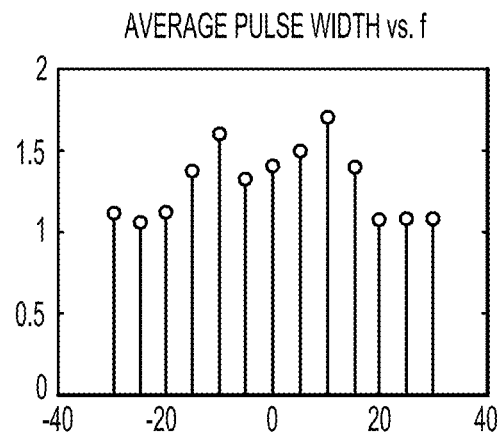

Subplots in FIGS. 7B and 8B show average pulse width estimation at different frequency offsets. The correct number should be 0.5 µs. Without the techniques presented herein, the estimated pulse widths are way higher than 0.5 µs, and with the techniques presented herein, it is between 1.1 to 1.7 µs.

Figure 7C:
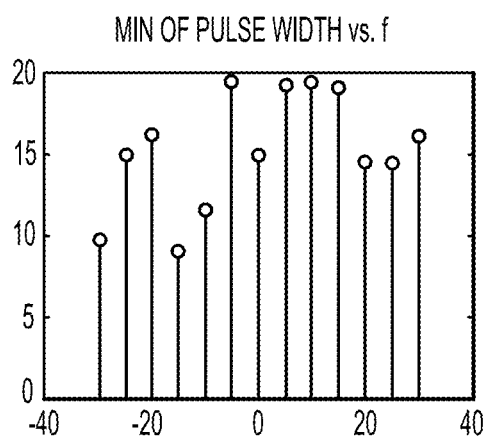
Figure 8C:
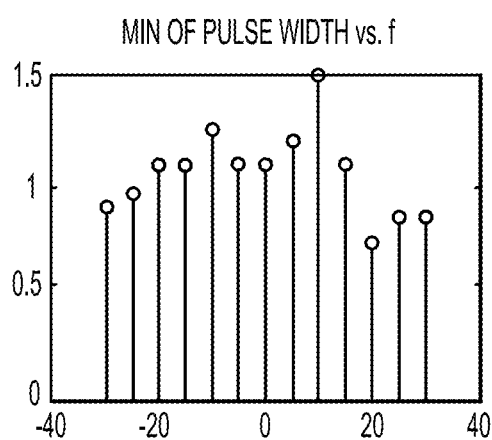

Subplots in FIGS. 7C and 8C show minimum pulse width estimation at different frequency offsets. Without the techniques presented herein, the minimum pulse widths are between 9 and 19.4 µs. Using the techniques presented herein, the minimum pulse widths are between 0.7 to 1.5 µs.

Figure 7D:
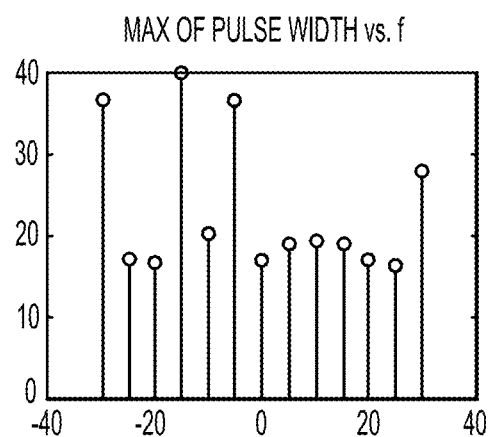
Figure 8D:
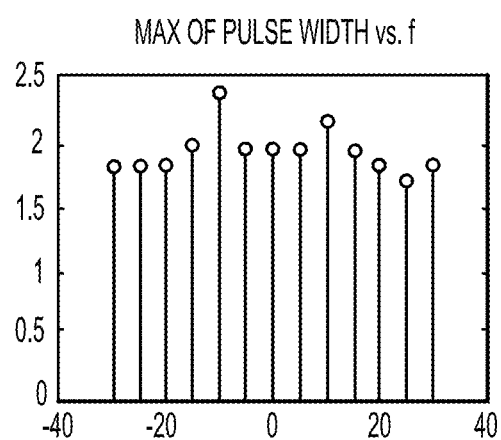

Subplots FIGS. 7D and 8D show maximum pulse width estimation at different frequency offsets. Without the techniques presented herein, the maximum pulse widths are between 16 and 40 µs. Using the techniques presented herein, the maximum pulse widths are between 1.7 to 2.4 µs.

The DC correction techniques presented herein also avoid false DC correction (e.g., reduction), that is, these techniques avoid applying DC reduction when it should not be applied. This involves a tradeoff between achieving the highest DC reduction and false DC reduction. The techniques presented herein do not use a linear filter to reduce the false DC reduction, and therefore achieve higher DC reduction.

Figure 9:
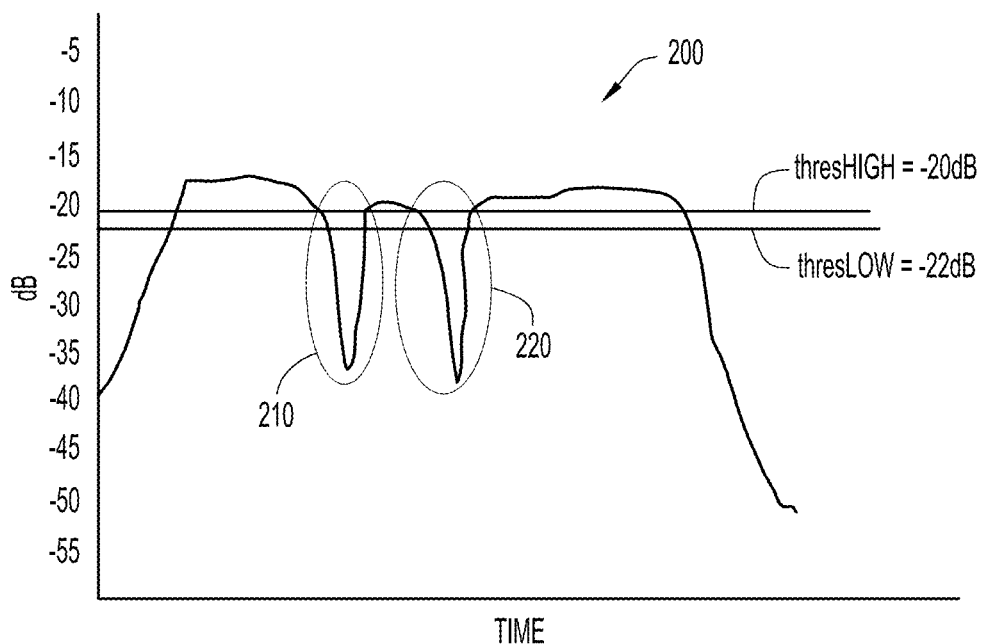
FIG. 9 is an example a plot of samples and showing false DC correction when the DC correction techniques presented herein are not used.
Figure 10:
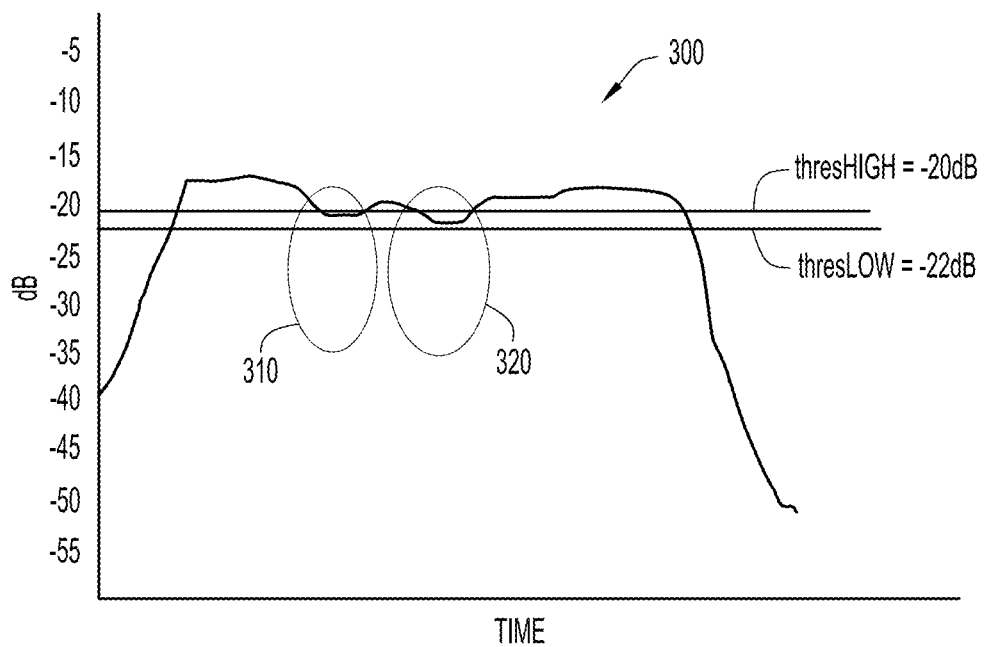
FIG. 10 is an example plot of samples and showing avoidance of false DC correction when the DC correction techniques presented herein are used.

Turning now to FIGS. 9 and 10, example plots are shown of receive signal samples, where FIG. 9 shows the plot when the DC correction techniques presented herein are not used, and FIG. 10 shows the plot when the DC correction techniques presented herein are used. In these figures, thresHigh is −20 dB and thresLow is −22 dB. FIG. 9 shows a plot 200 of signal samples in which false DC corrections are made at 210 and 220. In other words, DC corrections were made to the signal samples such that the resulting corrected samples created the downward peaks 210 and 220, when in fact, no such corrections should have been made. FIG. 10 shows a plot 300 of signal samples for the same sample data as that shown in FIG. 9, but for which the techniques presented herein were used. The plot 300 shows the results when the techniques presented herein are used. The false DC corrections causing the downward peaks 210 and 220 of FIG. 9 do not occur, as indicated at 310 and 320 in FIG. 10.

To reiterate, the DC correction techniques presented herein use a dynamic moving/expanding window size to speed up response time, and this greatly helps in accurate detection of very short duration pulses. In addition, these techniques use a dynamic DC threshold in order to distinguish between a DC component of a real signal versus circuit energy at DC, so that detection of a real signal near DC (zero frequency) can be preserved, and false detection caused by over-correction (for DC energy) can be avoided.

To again summarize, a method is provided comprising: obtaining samples of a received signal derived from output of a receiver of a communication device; computing a mean of the samples over a sample window comprising a predetermined number of samples; providing first and second thresholds, the first threshold being greater than the second threshold; comparing an absolute value of the mean with respect to the first threshold and the second threshold as samples are obtained in the sample window; and selecting either the first threshold or the second threshold for purposes of comparison with the absolute value of the mean to determine whether energy at DC is (i.e., results from) a DC component of the received signal or is due to (i.e., caused by DC) circuitry of the receiver.

Similarly, an apparatus comprising: a receiver configured receive a transmitted signal over a communication channel and generate a received signal; and a signal processor coupled to the receiver and configured to: obtain samples of the received signal; compute a mean of the samples over a sample window comprising a predetermined number of samples; provide first and second thresholds, the first threshold being greater than the second threshold; compare an absolute value of the mean with respect to the first threshold and the second threshold as samples are obtained in the sample window; and select between the first threshold and the second threshold for purposes of comparison with the absolute value of the mean to determine whether energy at DC is (i.e., results from) a DC component of the received signal or is due to (i.e., caused by DC) of circuitry of the receiver.

Further still, one or more computer readable storage media are provided encoded with software comprising computer executable instructions and when the software is executed operable to: obtain samples of a received signal derived from output of a receiver of a communication device; compute a mean of the samples over a sample window comprising a predetermined number of samples; provide first and second thresholds, the first threshold being greater than the second threshold; compare an absolute value of the mean with respect to the first threshold and the second threshold as samples are obtained in the sample window; and select between the first threshold and the second threshold for purposes of comparison with the absolute value of the mean to determine whether energy at DC is (i.e., results from) a DC component of the received signal or is due to (i.e., caused by DC) of circuitry of the receiver.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   obtaining samples of a received signal derived from output of a receiver of a communication device;
   computing a mean of the samples over a sample window comprising a predetermined number of samples;
   providing first and second thresholds, the first threshold being greater than the second threshold;
   comparing an absolute value of the mean with respect to the first threshold and the second threshold as samples are obtained in the sample window; and
   selecting either the first threshold or the second threshold for purposes of comparison with the absolute value of the mean to determine whether energy at direct current (DC) is a DC component of the received signal or is due to circuitry of the receiver.

2. The method of claim 1, further comprising, for a given sample:
   incrementing a counter, initialized at zero, when it is determined that the absolute value of the mean is greater than the first threshold;
   determining whether the counter is greater than zero;
   when it is determined that the counter is greater than zero, decrementing the counter when it is determined that the absolute value of the mean is not greater than the first threshold;
   wherein selecting comprises selecting the first threshold when it is determined that the absolute value of the mean is greater than the first threshold and selecting the second threshold when it is determined that the absolute value of the mean is not greater than the first threshold and the counter is greater than zero.

3. The method of claim 2, when the absolute value of the mean is not greater than the first threshold and the counter is not greater than zero, selecting comprises selecting the first threshold.

4. The method of claim 2, further comprising:
   setting a DC correction value equal to zero when the absolute value of the mean is greater than a selected one of the first threshold or the second threshold, and otherwise setting the DC correction value to the mean; and
   subtracting the DC correction value from future samples outside of the sample window to generate output samples.

5. The method of claim 2, further comprising expanding the sample window to form an expanded sample window that includes the predetermined number of samples and future samples, and repeating the obtaining, computing, comparing, and selecting over the expanded sample window.

6. The method of claim 5, wherein expanding the sample window comprises doubling a size of the sample window until a maximum window size is reached.

7. The method of claim 1, further comprising estimating time durations of pulses based on the output samples.

8. The method of claim 1, wherein obtaining samples comprises generating in-phase (I) samples and quadrature (Q) samples from output of a radio frequency receiver of a wireless communication device, and wherein computing, comparing, and selecting are performed for both I samples and Q samples.

9. An apparatus comprising:
   a receiver configured receive a transmitted signal over a communication channel and generate a received signal; and
   a signal processor coupled to the receiver and configured to:
      obtain samples of the received signal;
      compute a mean of the samples over a sample window comprising a predetermined number of samples;
      provide first and second thresholds, the first threshold being greater than the second threshold;
      compare an absolute value of the mean with respect to the first threshold and the second threshold as samples are obtained in the sample window; and
      select between the first threshold and the second threshold for purposes of comparison with the absolute value of the mean to determine whether energy at direct current (DC) is a DC component of the received signal or is due to circuitry of the receiver.

10. The apparatus of claim 9, wherein the signal processor is further configured to, for a given sample:
    increment a counter, initialized at zero, when it is determined that the absolute value of the mean is greater than the first threshold;
    determine whether the counter is greater than zero;

when it is determined that the counter is greater than zero, decrement the counter when it is determined that the absolute value of the mean is not greater than the first threshold; and select the first threshold when it is determined that the absolute value of the mean is greater than the first threshold and select the second threshold when it is determined that the absolute value of the mean is not greater than the first threshold and the counter is greater than zero.

11. The apparatus of claim 10, wherein the signal processor is further configured to, when the absolute value of the mean is not greater than the first threshold and the counter is not greater than zero, select the first threshold.

12. The apparatus of claim 10, wherein the signal processor is further configured to:

set a DC correction value equal to zero when the absolute value of the mean is greater than a selected one of the first threshold or the second threshold, and otherwise set the DC correction value to the mean; and subtract the DC correction value from future samples outside of the sample window to generate output samples.

13. The apparatus of claim 10, wherein the signal processor is further configured to expand the sample window to form an expanded sample window that includes the predetermined number of samples and future samples, and to repeat the obtain, compute, compare, and select operations over the expanded sample window.

14. The apparatus of claim 13, wherein the signal processor is configured to the expand the sample window by doubling a size of the sample window until a maximum window size is reached.

15. One or more non-transitory computer readable storage media encoded with software comprising computer executable instructions and when the software is executed operable to:

obtain samples of a received signal derived from output of a receiver of a communication device;

compute a mean of the samples over a sample window comprising a predetermined number of samples;

provide first and second thresholds, the first threshold being greater than the second threshold;

compare an absolute value of the mean with respect to the first threshold and the second threshold as samples are obtained in the sample window; and select between the first threshold and the second threshold for purposes of comparison with the absolute value of the mean to determine whether energy at direct current (DC) is a DC component of received signal or is due to circuitry of the receiver.

16. The non-transitory computer readable storage media of claim 15, further comprising instructions operable to, for a given sample:

increment a counter, initialized at zero, when it is determined that the absolute value of the mean is greater than the first threshold;

determine whether the counter is greater than zero;

when it is determined that the counter is greater than zero, decrement the counter when it is determined that the absolute value of the mean is not greater than the first threshold;

wherein the instructions operable to select comprise instructions operable to select the first threshold when it is determined that the absolute value of the mean is greater than the first threshold and to select the second threshold when it is determined that the absolute value of the mean is not greater than the first threshold and the counter is greater than zero.

17. The non-transitory computer readable storage media of claim 16, wherein the instructions operable to select comprise instructions operable to select the first threshold when the absolute value of the mean is not greater than the first threshold and the counter is not greater than zero.

18. The non-transitory computer readable storage media of claim 16, further comprising instructions operable to:

set a DC correction value equal to zero when the absolute value of the mean is greater than a selected one of the first threshold or the second threshold, and otherwise set the DC correction value to the mean; and subtract the DC correction value from future samples outside of the sample window to generate output samples.

19. The non-transitory computer readable storage media of claim 16, further comprising instructions operable to expand the sample window to form an expanded sample window that includes the predetermined number of samples and future samples, and repeat the obtain, compute, compare, and select operations over the expanded sample window.

20. The non-transitory computer readable storage media of claim 19, wherein the instructions operable to expand the sample window comprise instructions operable to double a size of the sample window until a maximum window size is reached.

* * * * *